United States Patent Office 3,346,336
Patented Oct. 10, 1967

3,346,336
PRODUCTION OF ALUMINA
John C. Hayes, Palatine, Ill., assignor to Universal Oil Products Company, Des Plaines, Ill., a corporation of Delaware
No Drawing. Filed Nov. 3, 1964, Ser. No. 408,678
13 Claims. (Cl. 23—143)

ABSTRACT OF THE DISCLOSURE

A method for preparing eta-alumina spheres by adding an acidic alumina hydrosol instantaneously to an alkali solution to form a stable alumina hydrosol which is converted to bayerite hydrogel spheres by heating in a suspending medium and calcining to eta-alumina.

---

The present invention relates to a novel method for the production of alumina particles, and, more specifically, is directed toward the preparation of spherical alumina particles of a particular physical modification.

The use of alumina particles in substantially spherical or spheroidal shape, offers numerous advantages when the alumina is employed as an adsorbent, treating, refining or purifying agent, and particularly as a catalyst or component of a catalyst for the conversion of organic compounds and hydrocarbonaceous mixtures. The use of spherical particles, disposed as a fixed-bed of material, permits more uniform packing, thereby reducing variations in pressure drop and channeling which otherwise results in a portion of the bed being by-passed. As hereinafter indicated, the present invention, in one embodiment, encompasses a method for manufacturing spherical alumina particles possessing physical characteristics whereby the same are significantly more advantageous for use as hereinabove set forth.

Alumina, as porous alumina oxide, either in an anhydrous form, or as an aluminum oxide hydrate, or aluminum hydroxide, is widely employed throughout the chemical and petroleum industries. Various physical modifications of alumina are known as activated alumina, or activated alumina of commerce, and are especially employed for their pronounced catalytic activity and adsorptive capacity. The various physical modifications of high temperature calcined alumina are commonly known as alpha-alumina, theta-alumina, gamma-alumina, and eta-alumina: in addition, they may be designated as bayerite, bohmite and gibbsite, etc., when they are prepared or occur as low temperature forms. In the present specification and appended claims, the nomenclature employed with reference to the various forms and modifications of alumina is that which is found in Alumina Properties, Technical Paper No. 10, Alcoa 1960, Second Revision, pages 9, 36 and 37.

Many of the various forms and physical modifications of alumina, or aluminum hydroxide, may be prepared in the laboratory in accordance with the following procedures: alpha-alumina monohydrate (bohmite) is one of the phases formed by commingling ammonium hydroxide with a suitable salt of aluminum such as aluminum chloride. This reaction is represented by the following equation:

$$2AlCl_3 + 6NH_4OH \rightarrow \alpha Al_2O_3 \cdot H_2O + 6NH_4Cl + 2H_2O \quad (1)$$

When bohmite is subjected to aging in a cold alkaline solution, alpha-alumina trihydrate (gibbsite) is formed as indicated in the following equation:

$$\alpha Al_2O_3 \cdot H_2O \rightarrow \alpha Al_2O_3 \cdot 3H_2O \quad (2)$$

Beta-alumina trihydrate (bayerite) is formed by aging bohmite in an ammonium hydroxide solution, and, although bayerite contains two additional molecules of water, it may revert to bohmite upon prolonged contact with hot water. These procedures are indicated by the following equations:

$$\alpha Al_2O_3 \cdot H_2O \xrightarrow{NH_4OH} \beta Al_2O_3 \cdot 3H_2O \quad (3)$$

$$\beta Al_2O_3 \cdot 3H_2O \xrightarrow{H_2O} \alpha Al_2O_3 \cdot H_2O \quad (4)$$

Still another form of alumina, designated as a gamma-alumina, is a high temperature form which is considered especially suitable either for use as a carrier material for other catalytically active components, or as a catalyst in and of itself. This form of gamma-alumina is represented by the following formula:

$$\gamma Al_2O_3 \cdot (H_2O)_x \quad (5)$$

where $x$ is less than about 0.3, and preferably less than about 0.15. This particular form of gamma-alumina is differentiated from alpha-alumina trihydrate (gibbsite) and alpha-alumina monohydrate (bohmite) by the fact that there is technically no water of hydration; that is, this gamma-alumina is commonly referred to as "dry" gamma-alumina. Any water which may be present therewith is chemisorbed in an amount less than about 0.3 moles per mole of alumina or about 5.0% by weight, whereas gibbsite contains about 35.0% by weight of water, and alpha-alumina monohydrate (bohmite), contains about 15.0% by weight of water. Furthermore, alumina particles of the bohmite modification are transformed, upon high-temperature calcination (generally in an atmosphere of air), conducted at about 700° F. to about 1200° F., into gamma-alumina.

The form of alumina prepared in accordance with the method of the present invention, is eta-alumina, and has the following formula:

$$\eta Al_2O_3 \cdot (H_2O)_x \quad (6)$$

It will be noted that the structural formula for eta-alumina is identical to that of gamma-alumina. However, the actual structure, or configuration, which these two forms of alumina take, is substantially different one from the other. For example, gamma-alumina, following the high-temperature calcination of the bohmite modification, produces a particle having a surface area of about 180 square meters per gram. Eta-alumina, prepared by the high-temperature calcination of the bayerite modification, has a surface area of more than 300 square meters per gram, and, as hereinafter set forth in a specific example, as high as 350 square meters per gram.

As will be recognized by those possessing skill within the art of catalysis and the manufacture of various catalytic composites, a carrier material, such as alumina, having a surface area of about 300 to 350 square meters per gram, is infinitely more desirable than a carrier material which has a maximum surface area in the range of 180 to 200 square meters per gram. The former has a significantly greater adsorptive capacity per unit weight than the latter, and, when utilized as a carrier material in the manufacture of catalytic composites, possesses a higher intrinsic acidity as well as the tendency to retain the active catalytic components to a greater degree during processing.

A object of the present invention is to produce spherical alumina particles of the eta-modification possessing the greater surface area. Another object is to decrease significantly the expense involved in forming spherical alumina particles by the well-known "oil-drop" method as exemplified by U.S. Patent No. 2,620,314, issued to James Hoekstra.

Another object of the present invention is to produce a stable, alkaline alumina-containing hydrosol which can be utilized in the oil-drop method for preparing the bayerite alumina hydrogel particles which, upon high-temperature calcination, result in alumina of the eta-modification.

Therefore, in a broad embodiment, the present invention relates to a method of preparing a stable alkaline alumina hydrosol, which method comprises instantaneously adding an acidic alumina hydrosol to a solution of a hydroxide of an alkali metal selected from the group consisting of lithium, potassium, rubidium and cesium.

A more limited embodiment of the present invention involves a method of preparing bayerite alumina hydrogel, which method comprises instantaneously adding an acidic alumina hydrosol to a solution of an alkali metal selected from the group consisting of lithium, potassium, rubidium and cesium, which hydroxide solution has a molar concentration of from about 7.0 to about 8.0, and heating the resultant thermosetting alkaline alumina hydrosol at a temperature of from about 85° C. to about 105° C.

A more specific embodiment of the present invention involves a method of preparing spherical alumina particles having a surface area above about 300 square meters per gram, which method comprises instantaneously adding an aluminum chloride hydrosol to a potassium hydroxide solution in a volumetric ratio of potassium hydroxide to hydrosol of at least about 1:1, introducing the resulting alkaline alumina hydrosol in the form of droplets into a water-immiscible suspending medium maintained at a temperature of from about 85° C. to about 105° C., drying the thus-formed bayerite alumina hydrogel spheroids and thereafter calcining the hydrogel spheroids at a temperature within the range of from about 400° C. to about 600° C.

From the foregoing embodiments, it will be readily ascertained that the present invention encompasses a method of preparing a stable, alkaline alumina hydrosol, the preparation of which has heretofore been considered virtually impossible. The production of the alkaline alumina hydrosol permits, as hereinafter set forth, the formation of alumina hydrogel particles, in spherical form, without the necessity for the addition of expensive reagents otherwise required to effect proper gelation of the hydrosol into a firm hydrogel. That is to say, the alkaline alumina hydrosol, as distinguished from the present-day acidic alumina hydrosols, is thermosetting in character, as opposed to the acidic sol which requires neutralization prior to transformation into the hydrogel state. As hereinbefore set forth, the formation of hydrogel spheroids possessing the bayerite modification, ultimately leads to the production of calcined alumina particles in the form of eta-alumina having improved physical characteristics.

Extensive investigations have been conducted with respect to the manufacture of alumina particles, regardless of the ultimate intended use thereof; however, such investigations have been concentrated in the area of producing alumina particles having substantially uniform size and shape. This field of endeavor has led to the production of substantially spherical or spheroidal alumina particles, and particularly by a method which involves passing droplets of an alumina-containing hydrosol into a water immiscible liquid. As above set forth, exemplary of the prior art applicable to this particular method, is U.S. Patent No. 2,620,314, issued to James Hoekstra. Since it is known that alumina particles are not as readily manufactured by the oil-drop method as are some other inorganic oxide particles, for example, silica spheres, it is necessary to supplement the alumina-containing hydrosol with a reagent which will cause the hydrosol droplets to set into firm hydrogel spheroids within a given, desired time interval. In this regard, acceptable reagents include weak bases having a strong buffering action, such as hexamethylenetetramine. The function of the gelation agent is to partially neutralize the acidity of the hydrosol, such that the acidic hydrosol will reach the stage at which gelation will occur. The use of a conventional precipitating agent, such as ammonium hydroxide, is prohibited since the addition thereof to an aluminum salt solution, such as aluminum chloride, aluminum nitrate, aluminum sulfate, etc., produces an immediate gelatinous precipitate, as a result of which, spherically shaped particles cannot be formed. Furthermore, the alumina hydrogel spheroids resulting from the setting of an acidic alumina hydrosol, are of the bohmite modification which, upon high-temperature calcination results in a gamma-alumina having a maximum surface area of about 200 square meters per gram.

I have found a method by which a stable alkaline alumina hydrosol can be prepared, which type of hydrosol was heretofore considered virtually impossible to prepare. Furthermore, the alkaline alumina hydrosol, prepared as hereinafter set forth, does not require the addition of a gelation agent in order that the same is suitable for utilization in the formation of spherical particles by the oil-drop method. The alkaline alumina hydrosol is stable at about room temperature and slightly above, but is possessed with thermosetting properties such that the same will set to a gel at the relatively low temperature within the range of about 85° C. to about 105° C. The significant economic advantage is immediately recognized since gelation is effected in the absence of expensive gelation agents. Furthermore, the resulting hydrogel spheroids are of the bayerite modification, rather than the bohmite modification, and, therefore, result in eta-alumina having a significantly increased surface area which may be as high as 350 square meters per gram.

An alumina-containing hydrosol is generally prepared by digesting aluminum metal in a strong mineral acid, or other method which results in a hydrosol of aluminum chloride, aluminum nitrate, aluminum sulfate, etc. This hydrosol is, in actuality, a colloidal suspension of particles of a size less than about 0.1 micron, and therefore appears as a homogenous fluid, such the same as water, since there is no scattering of light. On the other hand, a hydrogel is generally considered to be a hydrosol which has become at least partially neutralized, or agglomerated, resulting in the formation of gelatinous material. To form spherical hydrogel particles of alumina, by introducing the hydrosol into a water-immiscible suspending medium, it is necessary to add a neutralization or gelling agent in order that the hydrosol droplet will gel during the time it is passing through the comparatively hot suspending medium. The alkaline alumina hydrosol, prepared in accordance with the method of the present invention, is thermosetting; that is, it is not necessary to add a gelation agent or neutralization agent prior to introducing droplets of the hydrosol into the suspending medium. The temperature of the suspending medium, of from about 85° C. to about 105° C., is of itself sufficient to cause the thermosetting property of the hydrosol to take effect and produce a set hydrogel spheroid.

Any suitable water-immiscible suspending liquid which will not vaporize at a temperature within the foregoing range may be employed. A particularly suitable suspending liquid comprises organic liquids such as kerosene, Nujol, and similar materials which will allow the droplets to settle at a rate such that the alumina sets into a firm hydrogel during its passage through the fluid medium. That the hydrosol being dropped is alkaline, as distinguished from the present-day acidic hydrosols, is of no consequence with respect to the character of the suspending medium. Following the formation of the hydrogel spheroids, the method of preparation follows that which is detailed in U.S. Patent No. 2,620,314. That is, briefly, the hydrogel spheroids are aged in material identical to that employed as the suspending medium for a period of about 12 to about 20 hours, thereafter aged in an ammoniacal solution for a period of about 12 to about 24 hours. After the hydrogel spheroids have been aged in the ammoniacal solution, they may be washed with water, preferably containing a small amount of ammonium hydroxide, and thereafter dried at a temperature within the range of from about 85° C. to about 105° C.

The thermosetting alkaline alumina hydrosol, to be formed into hydrogel spheroids in accordance with the above described oil-drop method, is prepared by instantaneously adding an acidic alumina hydrosol to a solution of an hydroxide of an alkali metal selected from the group consisting of lithium, potassium, rubidium and cesium. The acidic alumina hydrosol may be prepared by any suitable manner, and may involve the digestion of alumina metal in a strong mineral acid to yield a hydrosol of aluminum nitrate, aluminum sulfate or aluminum chloride. The latter is particularly preferred, and has an aluminum to chloride weight ratio of from about 1.05 to about 1.35. The alkali metal hydroxide solution, into which the acidic hydrosol is instantaneously added, is of a molar concentration within the range of about 7.0 to about 8.0, and the acidic sol is added in a volumetric ratio of at least about 1 to 1 of the hydroxide to the hydrosol.

An essential feature of the present invention is that the acidic alumina hydrosol is instantaneously added to the alkaline metal hydroxide solution, accompanied by vigorous stirring. Prior art methods of commingling these two solutions normally produce a gelatinous precipitate which sets immediately and, therefore, cannot be formed into the desired spherical shape. Such prior art methods include simultaneously commingling the two solutions at a predetermined rate, adding the hydroxide precipitant to the acidic alumina hydrosol over an extended period of time, or slowly adding the acidic hydrosol to the hydroxide precipitant over an extended period of time. Through the use of the method of the present invention, wherein the acidic alumina hydrosol is instantaneously added to the hydroxide solution, or dumped therein in total, a water-clear, thermosetting alkaline hydrosol is obtained. The alkaline hydrosol will have a viscosity which may be as low as water, will be stable for a period of at least six to eight hours at room temperature, and thermosetting when heated to a temperature within the range of from about 85° C. to about 105° C.

The following example is given to illustrate the method of the present invention, and to indicate the benefits afforded through the utilization thereof. It is understood that the present invention is not to be unduly limited to the precise reagents, concentrations and/or operating conditions employed.

*Example*

An acidic alumina hydrosol was prepared by dissolving aluminum metal in concentrated hydrochloric acid, and in an amount to produce an alumina sol having an aluminum to chloride weight ratio of 1.27, and containing about 12.15% by weight of aluminum. This alumina hydrosol was added to a potassium hydroxide solution having a molar concentration of 7.84, both the acidic hydrosol and hydroxide solution being employed in an amount of 100 cc. The acidic hydrosol was dumped rapidly into the potassium hydroxide, accompanied by vigorous stirring. During the five to about ten seconds of mixing, a general thickening of the mixture appeared; however, within an additional ten seconds the mixture regained its fluidity, and there was no indication of precipitated gel particles. A portion of this alkaline alumina hydrosol was found to have remained water-clear and fluid after being exposed to room temperature for about ten hours.

The remainder of the alkaline alumina hydrosol was introduced into a 40-inch dropping column in the form of ⅛-inch droplets. The column was filled with Nujol, and heated to a temperature of about 95° C. by a Nichrome wire heater wrapped around the column exterior. The formed hydrogel spheroids were subjected to a two-hour oil aging at a temperature of 95° C., and thereafter washed with hot water at a temperature of 95° C. The spheres were subsequently dried at a temperature of 105° C. and calcined for about two hours in an atmosphere of air at a temperature of 550° C. By X-ray analysis, it was determined that the crystalline phase present in the dried, but not calcined spheres, consisted predominantly of bayerite alumina.

An analysis of the spheres which had been calcined at a temperature of 550° C. indicated a surface area of 350 square meters per gram, and a composition which was predominantly in the form of eta-alumina.

From the foregoing specification and example, it will be readily ascertained that the method of the present invention affords unusual economic advantages in the production of spherical particles of alumina having an unusually high surface area. It is significant that the method resulted in firm spherical alumina particles having a surface area of 350 square meters per gram, as compared to about 200, and that such spheres were produced by the oil-drop method without the co-joint use of an expensive gelation agent.

I claim as my invention:

1. A method of preparing a stable alkaline alumina hydrosol which comprises instantaneously adding an acidic alumina hydrosol to a solution of an hydroxide of an alkali metal selected from the group consisting of lithium, potassium, rubidium and cesium.

2. A method of preparing a stable alkaline alumina hydrosol which comprises instantaneously adding an acidic alumina hydrosol to a solution of an hydroxide of an alkali metal selected from the group consisting of lithium, potassium, rubidium, and cesium, and having a molar concentration of from about 7.0 to about 8.0.

3. The method of claim 2 further characterized in that said hydroxide is potassium hydroxide.

4. The method of claim 2 further characterized in that said hydroxide is lithium hydroxide.

5. A method of preparing a stable alkaline alumina hydrosol which comprises instantaneously adding an aluminum chloride hydrosol, having an aluminum to chloride weight ratio within the range of from about 1.05 to about 1.35, to a solution of potassium hydroxide having a molar concentration of from about 7.0 to about 8.0.

6. The method of claim 5 further characterized in that said aluminum chloride hydrosol is added to the potassium hydroxide in a volumetric ratio of hydroxide to hydrosol of at least 1:1.

7. A method of preparing bayerite alumina hydrogel which comprises instantaneously adding an acidic alumina hydrosol to a solution of an hydroxide of an alkali metal selected from the group consisting of lithium, potassium, rubidium and cesium, and heating the resultant thermosetting alkaline alumina hydrosol at a temperature of from about 85° C. to about 105° C.

8. A method of preparing bayerite alumina hydrogel which comprises instantaneously adding an aluminum chloride hydrosol to a solution of potassium hydroxide having a molar concentration of from about 7.0 to about 8.0, and heating the resulting thermosetting alkaline alumina hydrosol at a temperature of from about 85° C. to about 105° C.

9. The method of claim 8 further characterized in that said acidic alumina hydrosol has an aluminum to chloride weight ratio within the range of from about 1.05 to about 1.35.

10. The method of claim 8 further characterized in that said hydrosol is instantaneously added to said potassium hydroxide in a volumetric ratio of hydroxide to hydrosol of at least 1:1.

11. A method of preparing spherical alumina particles having a surface area above about 300 square meters per gram, which method comprises instantaneously adding an aluminum chloride hydrosol to a potassium hydroxide solution in a volumetric ratio of potassium hydroxide to hydrosol of at least about 1:1, introducing the resulting alkaline alumina hydrosol in the form of droplets into a water-immiscible suspending medium maintained at a temperature of from about 85° C. to about 105° C., drying the thus-formed bayerite alumina hydrogel spheroids and thereafter calcining the hydrogel spheroids at a temperature within the range of from about 400° C. to about 600° C.

12. The method of claim 11 further characterized in that said aluminum chloride hydrosol has an aluminum to chloride weight ratio within the range of from about 1.05 to 1.35.

13. The method of claim 11 further characterized in that said potassium hydroxide is in a molar concentration of from about 7.0 to about 8.0.

References Cited

UNITED STATES PATENTS

| | | | |
|---|---|---|---|
| 1,540,446 | 6/1925 | Wilson | 23—143 X |
| 1,929,942 | 10/1933 | Barclay | 23—143 |
| 2,666,749 | 1/1954 | Hoekstra | 252—448 |
| 2,773,841 | 12/1956 | Kimberlin et al. | 23—143 X |
| 3,067,128 | 12/1962 | Kimberlin et al. | 23—143 X |
| 3,202,480 | 8/1965 | Nixon | 23—143 |

OSCAR R. VERTIZ, *Primary Examiner.*

G. T. OZAKI, *Assistant Examiner.*